United States Patent
Nieuwenhuys et al.

(10) Patent No.: US 10,051,327 B1
(45) Date of Patent: Aug. 14, 2018

(54) DETERMINATION OF USER PERSPICACIOUSNESS DURING A CONTENT STREAM

(71) Applicant: AdsWizz Inc., San Mateo, CA (US)

(72) Inventors: Bruno Nieuwenhuys, Sunnyvale, CA (US); Victor Mocioiu, Bucharest (RO); Adrian Hospodar, Bucharest (RO); Mihai Isaroiu, Bucharest (RO); Alexandru Cotiga, Bucharest (RO)

(73) Assignee: AdsWizz Inc., San Mateo, CA (US)

( * ) Notice: Subject to any disclaimer, the term of this patent is extended or adjusted under 35 U.S.C. 154(b) by 0 days.

(21) Appl. No.: 15/652,221

(22) Filed: Jul. 17, 2017

(30) Foreign Application Priority Data

May 16, 2017 (EP) .................................. 17464006

(51) Int. Cl.
  *H04N 7/16* (2011.01)
  *H04N 21/466* (2011.01)
  *H04N 21/442* (2011.01)
  *H04N 21/2187* (2011.01)
  *H04N 21/845* (2011.01)
  *H04L 12/26* (2006.01)
  *H04H 20/88* (2008.01)

(52) U.S. Cl.
  CPC ........ *H04N 21/4667* (2013.01); *H04H 20/88* (2013.01); *H04L 43/16* (2013.01); *H04N 21/2187* (2013.01); *H04N 21/44218* (2013.01); *H04N 21/8456* (2013.01)

(58) Field of Classification Search
  None
  See application file for complete search history.

(56) References Cited

U.S. PATENT DOCUMENTS

| | | | | |
|---|---|---|---|---|
| 2009/0254932 A1* | 10/2009 | Wang | ................. | H04N 7/17318 725/14 |
| 2010/0198982 A1* | 8/2010 | Fernandez | ............. | G06Q 30/02 709/231 |
| 2010/0205049 A1* | 8/2010 | Long | ...................... | G06Q 30/02 705/14.5 |
| 2011/0072448 A1* | 3/2011 | Stiers | ................. | H04N 7/17318 725/10 |
| 2011/0126102 A1* | 5/2011 | Archer | ............... | H04N 21/4147 715/716 |
| 2014/0096152 A1* | 4/2014 | Ferens | ............... | H04N 21/2668 725/12 |
| 2014/0316899 A1* | 10/2014 | McGowan | ......... | G06Q 30/0264 705/14.61 |

\* cited by examiner

*Primary Examiner* — Jason K Lin
(74) *Attorney, Agent, or Firm* — Fenwick and West LLP

(57) ABSTRACT

An online system predicts attention scores using a predictive model, each attention score representing a user's perspicaciousness as the user is accessing a live stream. The predictive model describes a relationship between a user's attention score and when the user joined the live stream. Therefore, when the online system receives a request to generate an attention score for a user that joined the live stream at a particular time, the online system applies the predictive model to determine a predicted attention score for the user. The online system can provide the predicted attention score to a content provider server such that the content provider server can select content items to be presented to each user during a break in the live stream. If users do not respond to presented content items as expected, the online system can update the predictive model to account for the unexpected responses.

20 Claims, 7 Drawing Sheets

300

Receive multiple training examples each corresponding to a user that accessed a previously live stream
305

Generate an attention score for each training example, each attention score reflecting the user's attention at a time point in the previously live stream
310

Generate a predictive model based on the attention scores for the training examples
315

FIG. 3A

DETERMINATION OF USER PERSPICACIOUSNESS DURING A CONTENT STREAM

CROSS REFERENCE TO RELATED APPLICATIONS

This application claims priority to European Patent Application 17464006.0, filed May 16, 2017, which is incorporated by reference in its entirety.

TECHNICAL FIELD

The disclosure generally relates user interactions, and more specifically to automatically determining user perspicaciousness during a content stream presented to the user.

BACKGROUND

Customization of delivered online multimedia content is a prolific area of research and innovation. For example, one may customize the content served through a live content stream, such as an audio or video stream, based on interests of a user that is viewing the live content. However, in many scenarios, conventional systems cannot guarantee that the user is paying attention to content served through a live stream, i.e., if the user was perspicacious to the content of the live stream. Therefore, even if conventional systems are able to provide content that may be of interest to a user, conventional systems experience subpar metrics if a user is not paying attention to the presented content.

BRIEF DESCRIPTION OF THE FIGURES

The disclosed embodiments have advantages and features which will be more readily apparent from the detailed description, the appended claims, and the accompanying figures (or drawings). A brief introduction of the figures is below

FIG. 3A is a flow process for generating a predictive model, in accordance with an embodiment.

DETAILED DESCRIPTION

Figure 1:
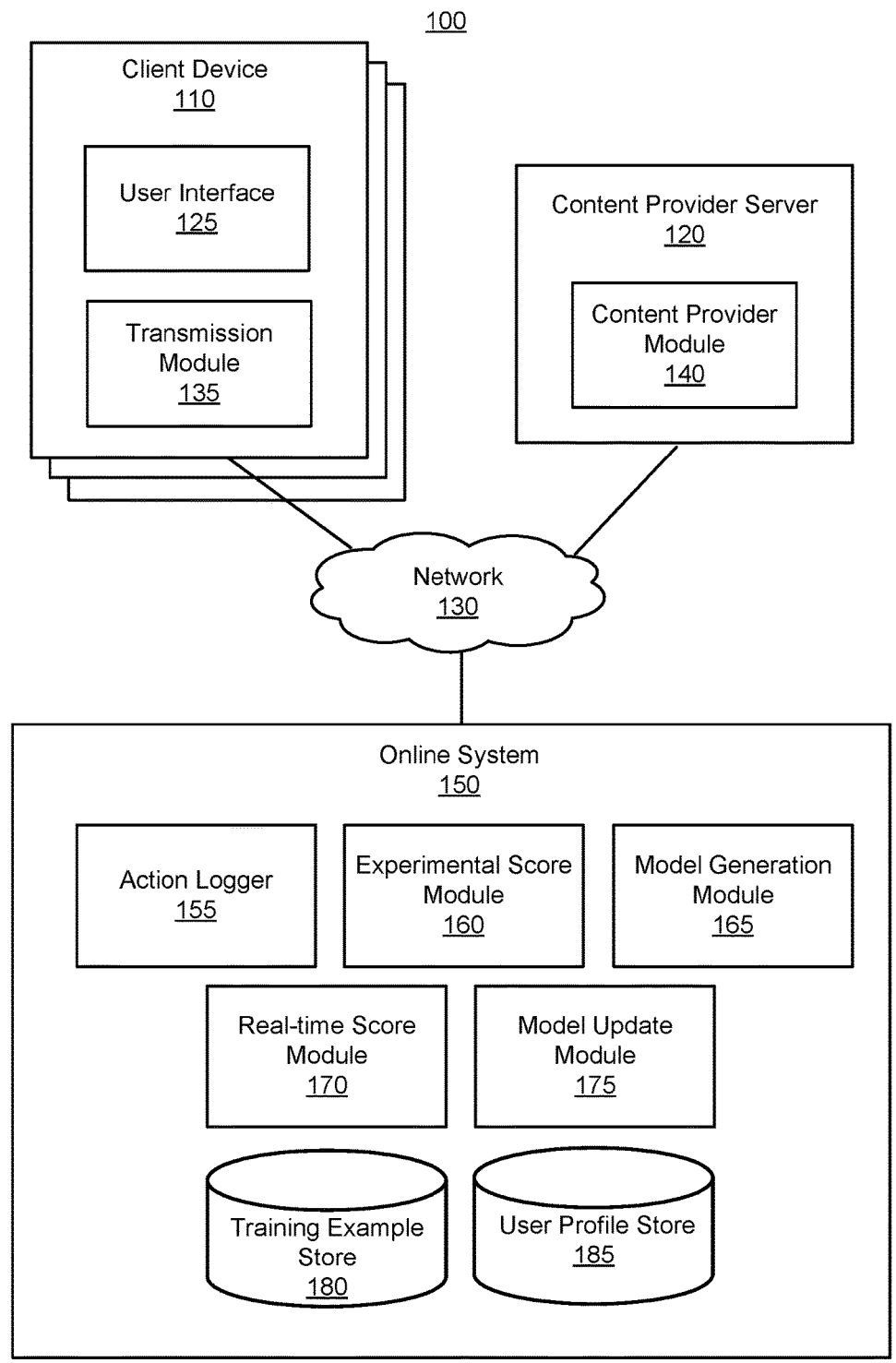
FIG. 1 illustrates an overall system environment for determining the perspicaciousness of a user, in accordance with an embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

An online system (and/or method and/or software program code) determines a user's perspicaciousness while the user is accessing a live stream. The determined user's perspicaciousness is expressed as an attention score. The online system provides the predicted attention score to a content provider server such that the content provider server can select content items, such as sponsored content, to be presented to the user during a break in the live stream that the user is currently accessing. As such, the online system enables the content provider server to provide content items that are more relevant for users based on whether the user is paying attention to the live stream. Therefore, this ensures that users can consume relevant content through the live stream while also ensuring that content provider servers avoid providing expensive content, such as expensive sponsored content, to users that are not paying attention to the live stream.

In various embodiments, the online system generates a predictive model that can be used to predict attention scores for users. The online system generates the predictive model using experimental training examples corresponding to users that have accessed previous live streams. In some scenarios, these previous live streams have now terminated. The predictive model predicts the attention score for a user as a function of a time since the user joined the live stream. Therefore, when the online system receives a request to generate an attention score for a user that joined the live stream at a particular time, the online system applies the predictive model to determine a predicted attention score for the user.

In various embodiments, the online system can update the predictive model in real-time. For example, if users currently accessing the live stream respond or do not respond to content items presented to the users during the break of the live stream, the online system can update the predictive model to take into consideration the response or non-response. Therefore, the online system can use the updated predictive model to predict attention scores of users for subsequent breaks in the live stream.

System Environment

Referring to FIG. (FIG. 1, it depicts a system environment 100 for determining the perspicaciousness of a user, according to an embodiment. In particular, the system environment 100 can include one or more client devices 110, a content provider server 120, and an online system 150, each of which are interconnected through a network 130. FIG. 1 depicts three client devices 110 and one content provider server 120 in the system environment 100. In various embodiments, the environment 100 may include fewer or more client devices 110 and/or content provider servers 120 than shown in FIG. 1. For example, the online system 150 may communicate with millions of client devices 110 through the network 130. In various embodiments, the content provider server 120 and the online system 150 are the same system in the system environment 100.

Network

The network 130 facilitates communications between the client device 110, content provider server 120, and online system 150. The network 130 may be any wired or wireless local area network (LAN) and/or wide area network (WAN), such as an intranet, an extranet, or the Internet. In various embodiments, the network 130 uses standard communication technologies and/or protocols. Examples of technologies used by the network 130 include Ethernet, 802.11, 3G, 4G, 802.16, or any other suitable communication technology. The network 130 may use wireless, wired, or a combination of wireless and wired communication technologies. Examples of protocols used by the network 130 include transmission control protocol/Internet protocol (TCP/IP), hypertext transport protocol (HTTP), simple mail transfer protocol (SMTP), file transfer protocol (TCP), or any other suitable communication protocol.

Client Device

The client device 110 is an electronic device such as a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 110 can be any device having computer functionality, such as a personal digital assistant (PDA), mobile telephone, smartphone, etc. The client device 110 may execute instructions (e.g., computer code) stored on a computer-readable storage medium. A client device 110 may include one or more executable applications, such as a web browser, to interact with services and/or content provided by the content provider server 120 and/or the online system 150. In another scenario, the executable application may be a particular application designed by the online system 150 and locally installed on the client device 110.

The user interface 125 on the client device 110 may be used to present content to a user of the client device 110. For example, the user interface 125 may be a display that presents a live stream (audio or video) or a content item (e.g., an advertisement) to a user of the client device 110. Additionally, the user interface 125 (via input components of the client device 110) detects a variety of inputs, such as user actions, from a user of the client device 110. In one embodiment, the user interface 125 receives an input from the user to join a live audio or live video stream that is provided by the content provider server 120. Other types of user actions may include an interaction (e.g., a click) with a presented content item or a changing of the volume. In various embodiments, the user interface 125 refers to hardware of the client device 110 such as a gyroscope and/or accelerometer that detects user actions. For example, the user interface 125 may detect a user action such as a changing orientation of the device (e.g., facedown placement, raising of the client device 110).

In various embodiments, the user interface 125 stores the actions that are performed by a user in relation to a live stream. For example, if a user action specifies a desire to join a live stream, the user interface 125 can record the user action and/or a timestamp associated with when the client device 110 joined the live stream.

The transmission module 135 transmits information to the content provider server 120 and/or the online system 150. For example, the transmission module 135 can transmit information pertaining to when a user of the client device 110 joins the live stream. Additionally or alternatively, the transmission module 135 can transmit identifying information of either the user or the client device 110 used by the user. For example, identifying information can include an internet protocol (IP) address of the client device 110, a user identifier, a device type, and the like. In various embodiments, the transmission module 135 may further transmit the user actions detected by the user interface 125 as well as any associated information such as a timestamp.

Content Provider Server

The content provider server 120 can provide content to the one or more client devices 110 to be consumed by a user of the client device 110. As one example, the content may be a content stream that includes audio or video information. As another example, the content may be an advertisement that includes an audio file, video file, image, and the like. The content provider server 120 includes a content provider module 140 to perform the steps described hereafter. Generally, the content provider module 140 provides one of a live audio stream or a live video stream to a client device 110. During the live stream, a break (e.g., a commercial break) may occur and therefore, the content provider module 140 provides a content item during the break. A content item can refer to one or more of an advertisement, a public service announcement, or an informational announcement (e.g., a game score, an update, a notification).

In various embodiments, in addition to providing content to client devices 110, the content provider module 140 provides a request to the online system 150. In one embodiment, the content provider module 140 provides a request when the content is accessed by a user of the client device 110. For example, when a client device 110 accesses a live stream, a request indicating that a client device 110 has accessed the live stream is sent by the content provider module 140 to the online system 150. In various embodiments, such a request may include timing information. For example, the request can include a timestamp corresponding to when the live stream was accessed by the client device 110. Additionally, the request can include a time point corresponding to a break in the live stream, hereafter referred to as a request time point, when a content item (e.g., an advertisement) is to be presented to users accessing the live stream. The content provider module 140 receives a measure of a user's perspicaciousness, such as a predicted attention score. In various embodiments, the content provider module 140 receives the predicted attention score in response to the sent request.

The content provider module 140 provides a content item selected for a target user. The content provider module 140 may categorize content items in separate categories and select a content item from a particular content category for a target user based on the target user's attention score. For example, the content provider module 140 may divide content items in N different content categories. Each content category may be defined by a characteristic of content items in the content category. As one example, a characteristic defining a content category may be a range of bid prices of the content item (e.g., advertisement). As another example, each content category may be defined as a type of the content item (e.g., advertisement, public service announcement, informational announcement). In one embodiment, the content provider module 140 may generate a first content category that includes content items, such as advertisements, that cost the content provider server 120 resources (e.g., money) to present the content item. The content provider module 140 may generate a second content category that includes content items, such as announcements, that cost the content provider server 120 limited or fewer resources to present in comparison to presenting a content item from the first content category. As one example, a content item included in the second content category may be silence, such that the client device 110 plays the silence during a break in the live audio or video stream.

In one embodiment, the content provider module 140 uses a user's attention score to determine an appropriate content item to be provide to the user during a break in the live stream. For example, the content provider server 120 uses the user's attention score to identify the content category from which a content item is to be retrieved. Therefore, the content provider module 140 can select a content item for the user based on whether the user is paying attention to the live stream. As one example, the content provider module 140 receives a user's predicted attention score and compares the received predicted attention score to a threshold value. If the predicted attention score is greater than the threshold value, the content provider module 140 selects a first content category from which the content item is to be retrieved. In one embodiment, the first content category includes content items, such as advertisements, that cost the content provider server 120 resources (e.g., money) to present the content item. Alternatively, if the received predicted attention score is below the threshold value, the content provider module 140 selects a second content category from which the content item is to be retrieved. In one embodiment, the second content category includes content items, such as announcements, that cost the content provider server 120 limited or fewer resources to present in comparison to presenting a content item from the first content category. Therefore, a user that is not paying attention to the live stream (e.g., as evidenced by the low predicted attention score) would receive a content item that costs the content provider server 120 fewer resources to present.

In some embodiments, the content provider module 140 receives the user's predicted attention score and compares the received predicted attention score to ranges of threshold values. Each range of threshold values can correspond to a content category (e.g., N ranges of threshold values for N different content categories). Therefore, if the received predicted attention score falls in a particular range, the content provider module 140 can retrieve a content item from the content category corresponding to that particular range.

For example, if the predicted attention score for a user is low, the content provider server 120 can avoid selecting and providing a high value content item to the user.

In addition to tailoring the content item based on the user's attention score, the content provider module 140 may further tailor the content item based on information of the target user (e.g., interests, age, gender, demographic group) such that the user would likely be interested in the content item. In some embodiments, the content provider module 140 may begin with a set of possible content items and select a subset of the content items based on content items that are likely to be of interest for the target user based on the information of the target user. Subsequently, the content provider module 140 can further narrow the subset of content items based on the attention score of the user. Thus, the content provider module 140 can select a content item from the narrowed subset of content items.

In some embodiments, the content provider server 120 receives a predicted user's attention score and uses it to analyze the performance of a provided the content item. Therefore, the predicted attention score can serve as an informative measure. As an example, a user may not click on a content item that the content provider server 120 provided. Additionally, the user may be associated with a low predicted attention score, indicating that that the non-interaction could likely be due to a user's lack of attention as opposed to a user's lack of interest in the content item. This can be advantageous because the content provider server 120 can avoid erroneously concluding that a user is not interested in subject matter of a content item when in fact the user is merely not paying attention to the content item.

Online System

The online system 150 generates and maintains a predictive model that can be used to predict a user's attention score in an ongoing live stream. To generate the predictive model, the online system 150 uses training examples that include information about users and their actions while accessing a stream that was previously live. Each training example can include timing information such as a timestamp that a user was accessing the previously live stream as well as a timestamp corresponding to when the user joined previously live stream. Therefore, the online system 150 uses each training example to determine an experimental attention score for a user based on the difference between the timestamp when the user was accessing the previous live stream and when the user joined the previous live stream. An attention score for a user can be a categorical value (for example MAXIMUM (MAX), HIGH, MEDIUM, LOW) or a numerical value (for example from 0 to 100). The online system 150 can compile the experimental attention scores for multiple users across the various time points. In one embodiment, the online system 150 generates a predictive model that describes a relationship of users' experimental attention score as a function of time. In one embodiment, a predictive model may be represented as a regression model. Additional details for how to compute the attention scores based on user actions are described below with reference to the experimental score module 160.

The predictive model can be used in real-time to determine predicted attention scores for users that are accessing a currently live stream. In one embodiment, the online system 150 receives a timestamp corresponding to when a user joined a live stream and a request time point corresponding to a future break in the live stream. The online system 150 predicts the user's attention score using the predictive model based on the difference of when the user joined the live stream and the request time point. The online system 150 can provide the predicted attention score to the content provider server 120 such that the content provider server 120 can determine which content item to provide to the user in a break of the live stream.

In various embodiments, the online system 150 can further update the model in real-time to account for unexpectedly higher or lower interest from the one or more users that are accessing the live stream. For example, the online system 150 can calculate a second attention score that is based on one or more user actions performed by the user in response to the content item that is selected by the content provider server 120 and provided to the client device 110 during a break of the live stream. Therefore, the online system 150 can compare the predicted attention score calculated by the predictive model to the second attention score calculated by considering the one or more user actions performed by a user in response to the content item. If the comparison yields a difference that is greater than a threshold value, the online system 150 updates the predictive model. Therefore, the updated predictive model can be used to calculate attention scores for a subsequent request time point that corresponds to a subsequent break in the live stream.

To perform the aforementioned processes, in various embodiments, such as the embodiment shown in FIG. 1, the online system 150 includes an action logger 155, an experimental score module 160, a model generation module 165, a real-time score module 170, and a model update module 175. The online system 150 may further include a training example store 180 and a user profile store 185. The methods performed by each of the modules is described in further detail below.

Determining a Score for a User's Perspicaciousness

The action logger 155 receives actions performed by users associated with client devices 110. Each user action may be performed in relation to a live stream or may be performed in relation to a content item presented during a break in a live stream. In various embodiments, each user action may correspond to a timestamp of the live stream, such as a timestamp in the live stream when the content item was presented. Examples of a user action can include a click (e.g., a click-through), a conversion, a change of the volume (e.g., volume up, volume down, mute, unmute), a skip of the content item, a joining of a live stream, an exiting of the live stream, placing a client device 110 facedown, a change in orientation of the client device 110, a raising of the client device 110, turning on or off the display of the client device 110, any interaction with the user interface 125 such as accessing an options menu, whether an output device such as speakers or headphones are connected through a port of the client device 110, if the client device is wirelessly connected (e.g., through Bluetooth) to an external device such as headphones or the speaker system of a car, if the user interface is running in the foreground or in the background on the client device 110.

The action logger 155 logs each received user action in an action log. In various embodiments, the action logger 155 further logs a timestamp associated with each user action. For example, if a user action is a joining of a live stream, the action logger 155 stores a timestamp of the live stream corresponding to when the user joined.

Although the action logger 155 is embodied within the online system 150 in FIG. 1, in various embodiments, the action logger may be additionally or alternatively embodied in the client device 110. An action logger 155 on the client device 110 stores locally performed user actions that otherwise may not be available to the online system 150. For example, the inclusion of an action logger that stores user actions on the client device 110 can be used to augment the user actions received and stored by the action logger 155 of the online system 150. For example, an action logger 155 of the online system 150 may not be able to access a subset of locally performed user actions on the client device 110. Locally performed user actions may include actions performed on the hardware of the client device 110, such as a button of a client device 110 (e.g., changing a volume). Additionally, locally performed user actions may be detected by the hardware of the client device 110 (e.g., a sensor such as a gyroscope or accelerometer) of the client device 110. Therefore, the action logger 155 of the client device 110 can log these user actions that are locally performed on the client device 110 and provide these locally performed user actions to the action logger 155 of the online system 150. Altogether, the client device 110 and the online system 150 can work together to fully understand user actions (including locally performed user actions) performed by a user of the client device 110 to determine the user's perspicaciousness.

In various embodiments, the user actions received and stored by the action logger 155 of the online system 150 corresponds to user actions performed by a user that was accessing a previous live stream. A previous live stream may no longer be live when the user actions are received and stored. Generally, these user actions performed by a user that was accessing a previous live stream formulate a training example and can be used to generate the predictive model that predicts a user's attention score. In other embodiments, the user actions received and stored by the action logger 155 corresponds to user actions performed by a user that is currently accessing a live stream. Generally, user actions performed by a user that is currently accessing a live stream can be used to determine the accuracy of the predictive model and/or to update the predictive model.

The experimental score module 160 determines experimental attention scores and provides them to the model generation module 165 for generation of the predictive model. In various embodiments, the experimental score module 160 generates experimental attention scores based on experimental training examples. Experimental training examples correspond to prior scenarios where a user joined a prior live stream. In various embodiments, each experimental training example includes 1) a timestamp corresponding to when the user joined the prior live stream (e.g., $t_{join}$), 2) one or more request time points each corresponding to a break in the prior live stream, 3) one or more user actions performed by the user while accessing the prior live stream, and 4) one or more timestamps each associated with a user action performed while the user was accessing the prior live stream.

In various embodiments, each experimental training example includes a join duration that represents the difference between when the user joined the prior live stream and a request time point corresponding to a break in the prior live stream. Therefore, in these embodiments, the join duration in the experimental training example can replace elements 1) and 2) (i.e., the timestamp and the request time point) as described above. Generally, the experimental score module 160 generates an experimental attention score for each experimental training example that is specific for a join duration.

The join duration, hereafter denoted as $\Delta t_1, \Delta t_2 \ldots \Delta t_n$, can be determined as the difference between a request time point, hereafter denoted as $t_1, t_2 \ldots t_3$ and the join timestamp for the user, hereafter denoted as $t_{join}$. In other words, the join duration for a user can be expressed as:

$$\Delta t_n = t_N - t_{join}$$

In various embodiments, the experimental score module 160 generates the experimental attention score while considering the user actions performed by the users (element 3 in the experimental training example). The experimental score module 160 can parse the received user actions according to the timestamps associated with the user actions that describe when each user action was performed. Generally, the experimental score module 160 identifies user actions performed by the user between a first request time point and a preceding request time point for determining an experimental attention score for the first request time point. For example, the experimental score module 160 identifies user actions that were performed between time $t_0$ and time $t_1$ for consideration in generating an experimental attention score for join duration $\Delta t_1$. As another example, the experimental score module 160 identifies user actions that were performed between time $t_1$ and $t_2$ for generating an experimental attention score for join duration $\Delta t_2$.

The experimental score module 160 considers user actions stored by the action logger 155 in generating an attention score for a time point. For example, user actions can indicate that a user is highly engaged and is paying attention to a live stream, hereafter referred to as positive attention user actions. For example, a positive attention user action includes a click through on a content item, volume increase, raising of the client device 110, selection of a full screen option, and the like. For each positive attention user action, the experimental score module 160 can increase the experimental attention score for the user at the request time. Alternatively, user actions that indicate that a user is not paying attention to the live stream, hereafter referred to as negative attention user actions, can be used by the experimental score module 160 to decrease the experimental attention score for the user. Negative attention user actions can include a volume decrease, placing a client device 110 face down, selecting an option to run the live stream in the background, placing the stream in a picture-in-picture mode, and the like. Additionally, a negative attention user action can also refer to user inaction. In various embodiments, the experimental score module 160 can assign a weight to each positive and negative attention user action such that each user action differently impacts the final experimental attention score.

In various embodiments, the experimental score module 160 considers information of a user to determine a score. The experimental score module 160 may retrieve information of a user from a user profile in the user profile store 185. Information stored in the user profile may include personal information of the user, such as the user's gender, age, demographic group, as well as geographic location of the user. Information stored in the user profile may additionally include information of the client device 110 associated with the user such as a device identifier and an internet protocol (IP) address. Additionally, information stored in the user profile may include preferences of the user such as interests as well as content consumption preferences. As an example, content consumption preferences of a user can include a preferred type of content (e.g., audio vs video content) or listening patterns of the user (e.g., time during the day during which the user consumes the content, average duration of consuming content by the user, and the like).

As a particular example of how the experimental score module 160 considers the content consumption preference of a user in determining an experimental score, a user profile may include a listening pattern of the user that specifies that the user typically listens to a content stream during weekdays from 1 PM to 5 PM. Therefore, assuming that the user has been connected to a content stream since 1 PM on Friday, if the experimental score module 160 is determining an experimental attention score for the user at 4 AM on Saturday, the experimental score module 160 may decrease the experimental attention score for the user to reflect the likelihood that although the client device 110 is currently accessing the content stream, the user is unlikely to be paying attention to the content stream. In some embodiments, the experimental score module 160 assigns a default score based on the information including the listening pattern. For example, in this example, the experimental score module 160 may assign an experimental attention score of 0%.

The model generation module 165 generates one or more predictive models using the experimental attention scores determined by the experimental score module 160. In various embodiments, each predictive model generated by the model generation module 165 is specific for a target audience. For example, a target audience may have a common defining characteristic such as a gender, age group, demographic group, geographic location, socioeconomic status, and the like. Therefore, in generating each predictive model, the model generation module 165 groups experimental attention scores that each correspond to users that have the defining characteristic. The model generation module 165 may retrieve the defining characteristic of a user from a user profile associated with the user in the user profile store 185.

Figure 2A:
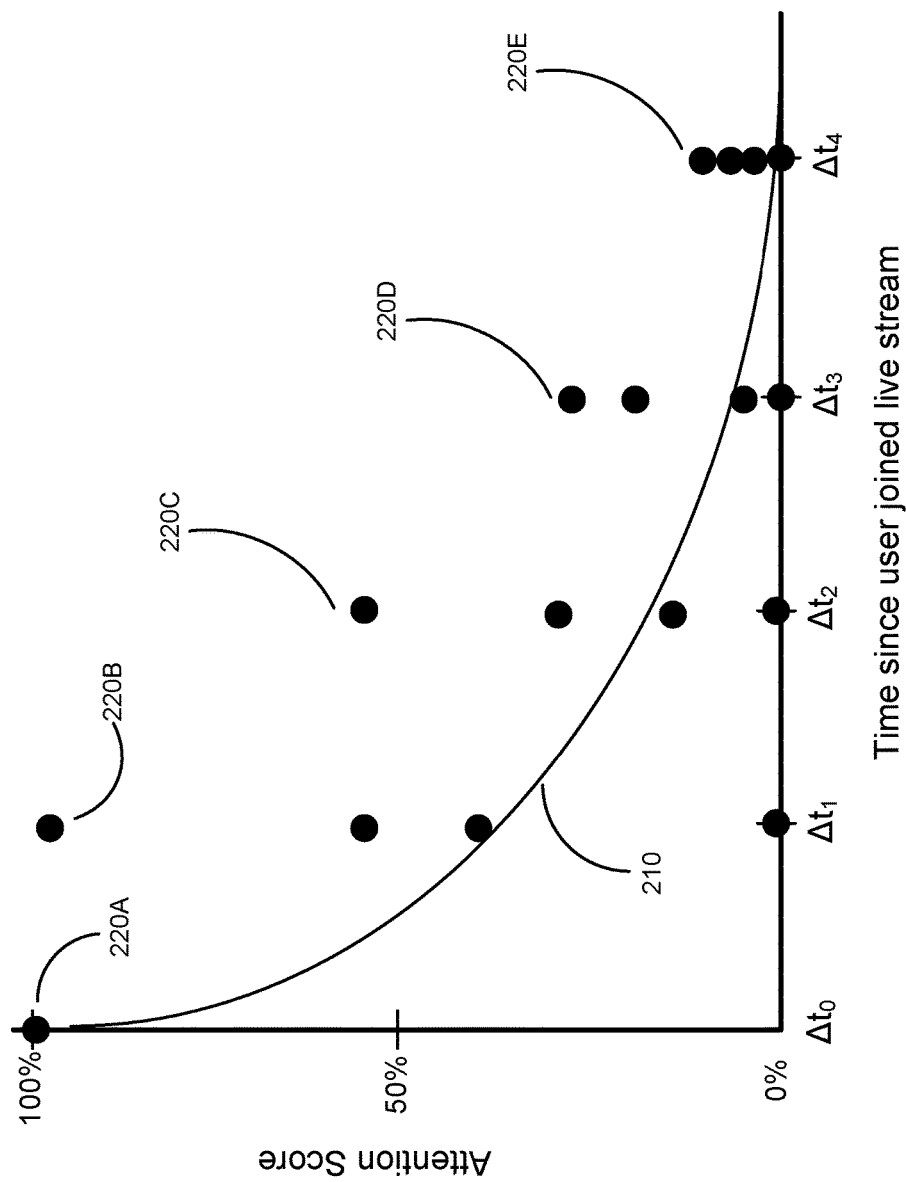
FIG. 2A depicts an example predictive model for determining the perspicaciousness of a user, in accordance with an embodiment.

Reference is now made to FIG. 2A which depicts an example predictive model, in accordance with an embodiment. Specifically, FIG. 2A depicts a relationship between user attention scores and the time since a user joined the live stream (e.g., join duration).

The model generation module 165 compiles experimental attentions scores based on their corresponding join duration (e.g., $\Delta t_n$) and generates a predictive model. Specifically, as shown in FIG. 2A, the model generation module 165 compiles experimental attention scores 220A corresponding to join duration $\Delta t_0$, experimental attention scores 220B corresponding to join duration $\Delta t_1$, as well as experimental attention scores 220C, 220D, and 220E corresponding to join durations $\Delta t_2$, $\Delta t_3$, and $\Delta t_4$ respectively. Although FIG. 2A depicts four experimental attention scores at each join duration, in various embodiments, the model generation module 165 can compile hundreds or even more experimental attention scores at each join duration.

In various embodiments, the model generation module 165 generates a predictive model using the compiled experimental attention scores. In one embodiment, the predictive model is a regression model. Therefore, the model generation module 165 performs a curve fit across the compiled attention scores. In various embodiments, the curve fit is an exponential decay function. Therefore, the average attention score as predicted by the predictive model decreases at a rate proportional to its current value. In other embodiments, the curve fit is one of a linear, exponential, logarithmic, quadratic, or polynomial function.

Returning to the example curve fit 210 shown in FIG. 2A, the exponential decay curve fit 210 is based on the compiled attention scores 220A-E at the various join durations (e.g., $\Delta t_n$). At a first join duration $\Delta t_0$, the initial attention scores $P_0$ (220A) are likely to be high (e.g., 100%) given that the user has recently joined the live stream. For a longer join duration $\Delta t_1$, the attention scores 220B may differentiate. For example, some users may still be highly engaged with the live stream and therefore, have a high attention score. However, other users may have no activity or may have exited the live stream altogether. This may be reflected by a lower or zero attention score. Each of the join durations $\Delta t_2$, $\Delta t_3$, and $\Delta t_4$ may show similar trends of decreasing attention scores 220C, 220D, and 220E. Thus, in many but not all cases, attention scores may decay over time.

In one example embodiment, the general format of an exponential decay curve fit can be expressed as:

$$P(\Delta t_n) = P_0 * e^{-\lambda(\Delta t_n)} \quad (1)$$

where $P(\Delta t_n)$ represents the attention score of a user for a join duration $\Delta t_n$. Therefore, the attention score $P(\Delta t_n)$ infers a measurement of the amount of attention the user is/would be paying to any content item that is presented to the user via the client device 110. Referring to the other variables in Equation (1), $P_0$ represents the initial attention of a user at initial time $t_0$, such as the join time $t_{join}$ when the user joined the live stream. The model generation module 165 determines the $\lambda$ value based on the applied curve fit. In other words, the $\lambda$ value is selected such that the curve fit best fits the distribution of the compiled experimental attention scores. The $\lambda$ value is a constant indicating the amount of decay of user responsiveness (i.e., how much the user pays attention), or perspicaciousness, over time.

In various embodiments, the exponential curve fit may include additional constants in addition to the λ value shown in Equation (1). As an example, Equation (2) depicts an exponential decay curve fit that may be expressed as:

$$P(t) = \left( \frac{e^{-\frac{\left(0.62*\log\left(\frac{(\Delta t_n)}{(\Delta t_n)-1}\right)-0.74\right)^2}{2}}}{\frac{(\Delta t_n)-0.05}{12}*\left(1-\frac{(\Delta t_n)-0.05}{12}\right)*\frac{1}{\sqrt{2\pi}}* \frac{1}{0.1285}} \right) *100 \quad (2)$$

In Equation (2), the constants of the exponential decay function are selected to achieve attention scores at particular times. For example, using Equation (2), if join duration $\Delta t_n=48$ minutes (e.g., attention score of a user 48 minutes after the user joined the live stream), then the attention score P=100. As another example, if $\Delta t_n=8$ hours, then the attention score $P(\Delta t_n)=50$. If $\Delta t_n=12$ hours, then the attention score $P(\Delta t_n)=0$.

The real-time score module 170 generates a predicted attention score for a target user for a particular time. Therefore, the predicted attention score can be provided (e.g., to a content provider server 120) to be used to tailor content items for the target user. As an example, the real-time score module 170 may generate and provide a predicted attention score in response to receiving a request (e.g., from the content provider server 120) for an attention score of the target user. The request may specific a request time point that corresponds to an anticipated break in an ongoing livestream where a content item, such as an advertisement, is to be presented to the target user. In addition, the request may further include a join timestamp corresponding to when the target user joined the ongoing live stream.

The real-time score module 170 retrieves the appropriate predictive model based on user information for the target user. For example, the real-time score module 170 identifies a user profile from the user profile store 185 that corresponds to the target user and extracts user information from the user profile. For example, the user information extracted from the user profile may be a defining characteristic of the user (e.g., an age, gender, demographic group, interests, and the like). The real-time score module 170 retrieves the predictive model that was generated based on experimental attention scores derived from users in a target audience that also have the defining characteristic. Therefore, using the appropriate predictive model, the real-time score module 170 can generate a predicted attention score that is reflective of the target user's perspicaciousness at the request time point specified by the request. In one embodiment, the real-time score module 170 generates the predicted attention score by applying the request time point and the join timestamp included in the request as inputs to the predictive model. The real-time score module 170 obtains the predicted attention score from the predictive model and provides the predicted attention score for the target user to the content provider server 120.

In various embodiments, the real-time score module 170 may further generate an updated attention score that corresponds to a previously generated predicted attention score. For example, the real-time score module 170 may receive feedback (e.g., from the content provider server 120), the feedback indicating user actions and/or user inaction taken by the target user when presented with a content item that the content provider server 120 selected based on the predicted attention score. Based on the user actions or inaction taken by the target user, the real-time score module 170 generates the updated attention score. In various embodiments, the real-time score module 170 generates the updated attention score for a target user in a similar fashion as compared to the experimental attention score generated by the experimental score module 160, as described above. Specifically, the real-time score module 170 considers whether each user action is a positive attention user action or a negative attention user action and generates an updated attention score based on the positive and negative attention user actions. In various embodiments, each user action is assigned a weight, thereby affecting the impact that each user action has on the final updated attention score. The real-time score module 170 can provide one or both of the predicted attention score and the updated attention score to the model update module 175.

Additionally, the real-time score module 170 may consider user profile information, such as the listening pattern of the target user, in determining the updated attention score. For example, the real-time score module 170 can evaluate the join timestamp of the target user and the request time point representing the anticipated break in the live stream in view of the user profile information. If the join timestamp and request time point correspond to a scenario that does not align with the typical listening pattern of the target user, the real-time score module 170 can adjust the updated attention score accordingly. For example, if the target user typically listens during a particular range during the day, the real-time score module 170 can lower the updated attention score if the request time point falls outside the particular range and that the join timestamp indicates that the user joined over an extensive period of time ago (e.g., several hours).

The model update module 175 determines whether the predicted attention score from the predictive model is accurate in comparison to the updated attention score which is a reflection of the actual attention of the target user. In other words, the model update module 175 determines whether the predictive model is accurate and applicable for predicting the perspicaciousness of a target user in the current live stream, and if not accurate, the model update module 175 updates the predictive model to reflect the observed actual attention of the target user.

In one embodiment, the model update module 175 compares the predicted attention score to the updated attention score and determines whether the difference is above a threshold. If the difference is above a threshold, the model update module 175 updates the predictive model accordingly. For example, if the predicted attention score indicates that a target user is likely to be highly engaged but the updated attention score indicates that the target user did not pay any attention to a content item (e.g., a low updated attention score), the model update module 175 may flag that the predicted attention score was highly inaccurate. The model update module 175 can then update the predictive model. In various embodiments, the predictive model is a regression model and therefore, the model update module 175 updates constant values of the regression model. For example, referring to Equation (1) above, the model update module 175 may adjust the λ value to be more indicative of the low updated attention score (e.g., increase the λ value). In other embodiments, the model update module 175 may adjust one or more different constant values of the predictive model. If the model update module 175 determines that the difference between the updated attention score and predicted attention score is within a threshold, the predictive model is maintained and held to be performing as expected.

Figure 2B:
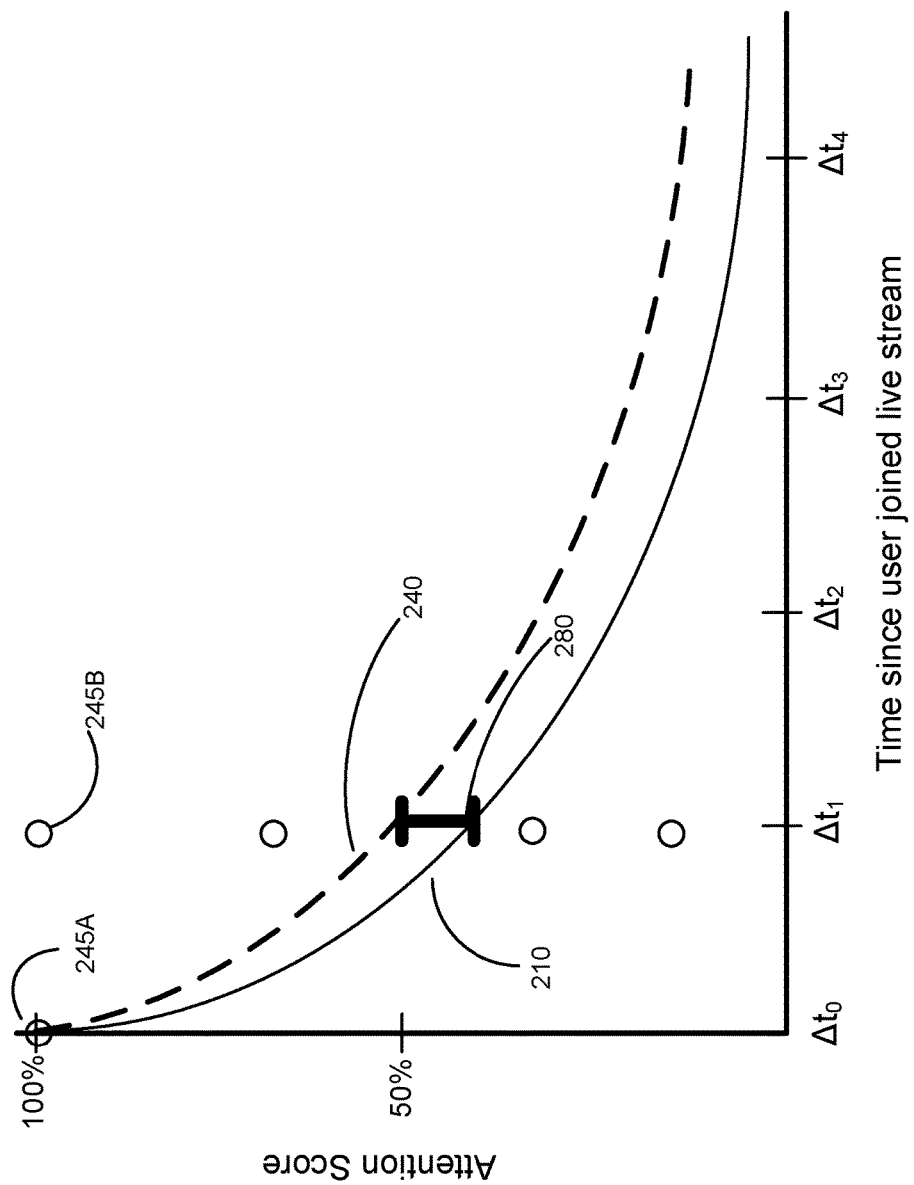
FIG. 2B depicts an evaluation of a predictive model, in accordance with an embodiment
Figure 2C:
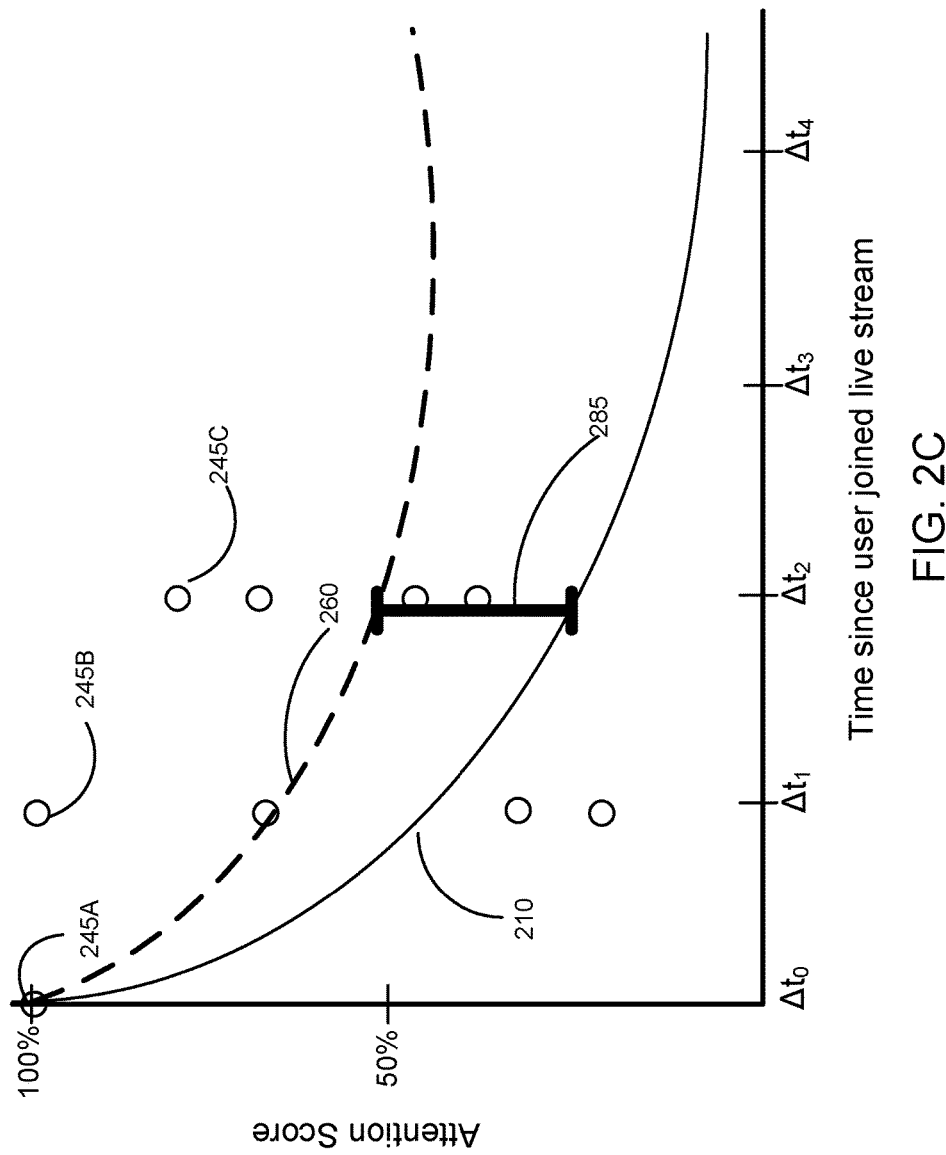
FIG. 2C depicts another evaluation of a predictive model, in accordance with an embodiment.

In various embodiments, the model update module 175 determines whether to update the predictive model based on multiple updated attention scores. Reference is made to FIGS. 2B and 2C, which each depicts an evaluation of a predictive model, in accordance with an embodiment. Specifically, for comparative purposes, FIG. 2B depicts the curve fit 210 of the predictive model (e.g., FIG. 2A), where the curve fit 210 was generated based on experimental attention scores. Additionally, FIG. 2B depicts updated attention scores 245A and 245B that correspond to join durations $\Delta t_0$ and $\Delta t_1$, respectively. Similarly, FIG. 2C depicts updated attention scores 245A, 245B, and 245C at corresponding join durations $\Delta t_0$, $\Delta t_1$, and $\Delta t_2$, respectively.

The model update module 175 may perform an updated curve fit, such as an exponential decay curve fit, using the updated attention scores. For example, the updated curve fit 240 in FIG. 2B is fit based on updated attention scores 245A at time $\Delta t_0$ and updated attention scores 245B at time $\Delta t_1$. Additionally, the updated curve fit 260 in FIG. 2C is fit based on updated attention scores 245A, 245B, and 245C. In various embodiments, the model update module 175 compares the updated curve fit 240 or 260 to the prior curve fit 210 and determines a shift. For example, FIG. 2B depicts a shift 280 whereas FIG. 2C depicts a shift 285. The shift 280 or 285 arises from differences between the updated attention scores and the experimental attention scores (e.g., 220A-E, as shown in FIG. 2A).

In various embodiments, the model update module 175 updates the predictive model based on a comparison between the shift 280 or 285 and a threshold value. For example, referring to FIG. 2B, the shift 280 may be below a threshold value. Therefore, the model update module 175 does not update the predictive model. In various embodiments, the model update module 175 does not update the constants of the curve fit representing the predictive model. The curve fit 210 can be further used by the real-time score module 170 to generate additional predicted attention scores. As another example, referring to FIG. 2C, the shift 285 may be above the threshold value. Therefore, the model update module 175 may update the predictive model by replacing the prior curve fit 210 with the updated curve fit 260. Therefore, the real-time score module 170 can use the updated curve fit 260 to generate additional predicted attention scores.

Of note, although examples FIGS. 2B and 2C depict sequential updates of the predictive model at different times since users joined the live stream (e.g., $\Delta t_1$ and $\Delta t_2$), in various embodiments, the model update module 175 may update the predictive model in a non-sequential manner because as different users may join the live stream at different times, each user may simultaneously contribute updated attention scores corresponding to different times (e.g., $t_1 \ldots \Delta t_N$).

Example Process for Determining a Measure of Perspicaciousness

FIG. 3A is a flow process for generating a predictive model, in accordance with an embodiment. The online system 150 receives 305 multiple training examples. Each training example includes information pertaining to a user that accessed a previously live stream. For example, the information in each training example can include a timestamp corresponding to when the user joined the previously live stream ($t_{join}$), one or more request time points ($t_N$), and/or one or more user actions performed by the user. The online system 150 generates 310 an experimental attention score for each training example. The generated attention score represents the user's attention (e.g., user's perspicaciousness) for a join duration $\Delta t_n$ in the previously live stream. The online system 150 generates 315 a predictive model based on the various experimental attention scores that were generated from the training examples. In various embodiments, the predictive model is a curve fit, such as an exponential decay curve fit that is generated based on the experimental attention scores corresponding to the training examples. In various embodiments, the online system 150 generates different predictive models for different target audiences, each target audience defined by one or more common characteristics (e.g., geographic location, personal information, and the like). Therefore, each predictive model may be tailored for each target audience. Each predictive model can be stored and later retrieved.

Figure 3B:
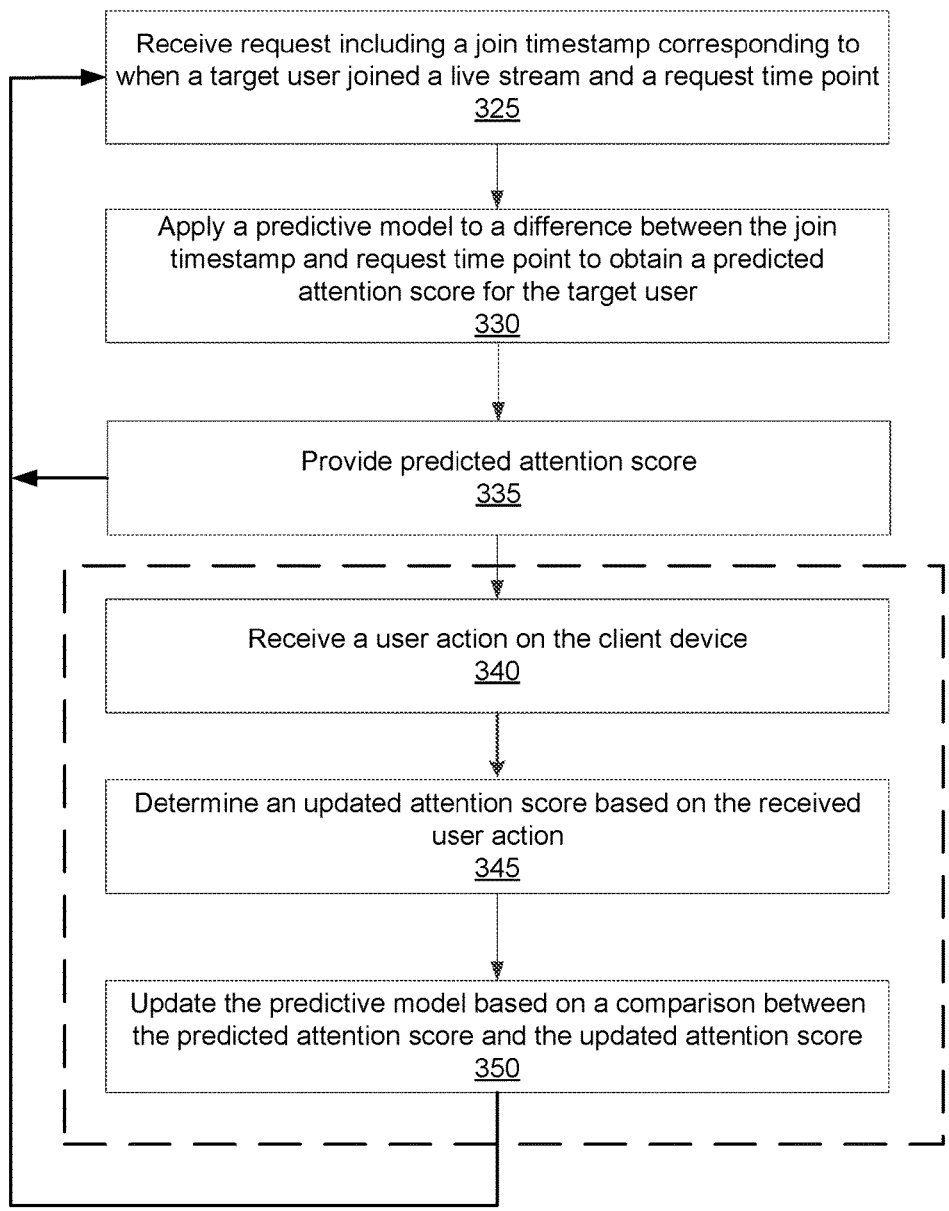
FIG. 3B is a flow process for determining an attention score for a user, in accordance with an embodiment.

FIG. 3B is a flow process for determining a predicted attention score for a target user, in accordance with an embodiment. The online system 150 receives 325 a request that includes a join timestamp corresponding to when a target user joined a current live stream and a request time point representing an anticipated break in the live stream. The online system 150 applies 330 a predictive model to at least the request time point in the request to obtain a predicted attention score. For example online system 150 applies 330 the predictive model to a difference between the join timestamp and the request time point.

In various embodiments, the online system 150 further considers defining characteristics of the target user. For example, the online system 150 may use a defining characteristic of the target user to select the appropriate predictive model. In various embodiments, the online system 150 provides 335 the predicted attention score obtained from the predictive model to the content provider server 120. Therefore, the content provider server 120 can tailor content items for a target user based on the predicted attention score for that user. The online system 150 can repeat the steps 325, 330, and 335 for subsequent requests for additional target users.

In various embodiments, the online system 150 can perform steps 340, 345, and 345 to update a predictive model in real-time. These steps may be optional, as indicated by the dotted box. The online system 150 receives 340 a user action on a client device 110 performed by the user. The online system 150 determines 345 an updated attention score taking into consideration the received user action. For example, the online system 150 may calculate the updated attention score in the same or similar fashion as step 310 when generating an experimental attention score for each training example. The online system 150 compares the updated attention score to the predicted attention score generated by the application of the predictive model. In various embodiments, if the comparison between the updated attention score and the predicted attention score from the predictive model differ by greater than a threshold amount, then the online system 150 updates 345 the predictive model. The online system 150 can process subsequent requests for attention scores for additional target users using the updated predictive model.

Example Machine Architecture

Figure 4:
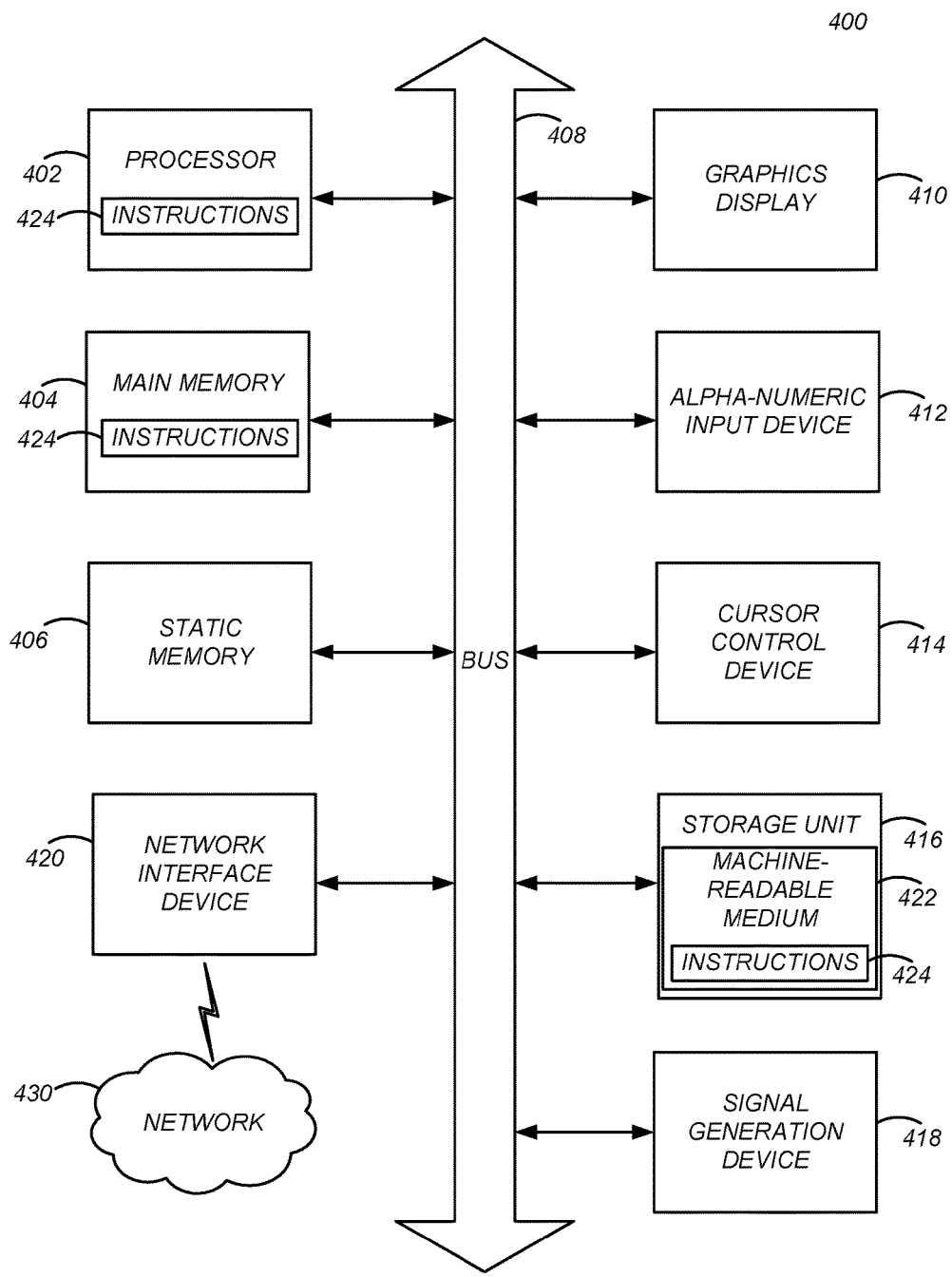
FIG. 4 is a block diagram illustrating components of an example machine able to read instructions from a machine-readable medium and execute them in a processor (or controller), according to an embodiment.

FIG. 4 is a block diagram illustrating components of an example machine able to read program code (comprised of instructions) from a machine-readable medium and execute them in a processor (or controller). Such an example machine, as shown in FIG. 4, can represent or be employed by the devices and/or systems as shown in FIG. 1. Specifically, FIG. 4 shows a diagrammatic representation of a machine in the example form of a computer system 400. The computer system 400 can be used to execute instructions 424 (e.g., program code or software) for causing the machine to perform any one or more of the methodologies (or processes) described herein. In other words, the processes described herein may be embodied as program code comprising instructions storable in the storage medium of the computer system and executable by the processor of the computer system 400. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. The computer system 400 is used to execute the processes and functionality described in the figures. It is noted that the computer system 400 is exemplary and that not all the components described herein may be necessary to execute the processes as described above.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processing units (generally processor 402). The processor 402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 400 also includes a main memory 404. The computer system may include a storage unit 416. The processor 402, memory 404 and the storage unit 416 communicate via a bus 408.

In addition, the computer system 400 can include a static memory 406, a display driver 410 (e.g., to drive a plasma display panel (PDP), a liquid crystal display (LCD), or a projector). The computer system 400 may also include alphanumeric input device 412 (e.g., a keyboard), a cursor control device 414 (e.g., a mouse, a trackball, a joystick, a motion sensor, or other pointing instrument), a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 may be transmitted or received over a network 430 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Embodiments of the invention as disclosed provides benefits and advantages that enable server, such as the content provider server, to understand the level of attention that a user is paying to a live stream. Therefore, the content provider server can provide content items, such as advertisements, to a target user that can be tailored based on the target user's interests, and additionally, tailored based on the level of attention that the target user is paying to the live stream. This may help a target user have a better experience in the live stream, while also enabling the content provider server to avoid providing expensive content items to target users that are not paying attention to the live stream.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in the figures. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software (e.g., instructions) to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for detecting user interest in a provided content item through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope.

What is claimed is:

1. A method comprising:
receiving a request comprising a join timestamp representing when a target user joined a live stream and a request time point representing a break in the live stream;
applying a predictive model to a join duration that represents a difference between the join timestamp and the request time point to generate a predicted attention score for the target user, the predicted attention score representing a perspicaciousness of a predicted user at the request time point;
determining whether the predicted attention score is greater than a threshold score; and
responsive to the determination that the predicted attention score is greater than the threshold score, retrieving a content item from a first content category of a plurality of content categories; and
providing the retrieved content item to the target user during the break in the live stream.

2. The method of claim 1, further comprising:
determining an updated attention score for the target user corresponding to the request time point;
comparing the updated attention score to the predicted attention score; and
determining whether to update the predictive model based on the comparison.

3. The method of claim 2, wherein determining the updated attention score comprises:
receiving one or more user actions performed by a user on a content item presented on a client device to the user during the break in the live stream; and
generating the updated attention score based on the one or more user actions.

4. The method of claim 3, wherein each of the one or more user actions is one of a click on the content item, a conversion, a skip of the content item, a change of volume on the client device, a change in orientation of the client device.

5. The method of claim 3, wherein generating the updated attention score based on the one or more user actions comprises:
for each of the one or more user actions:
assigning a weight to the user action; and
adjusting the updated attention score based on the weight assigned to the user action.

6. The method of claim 2, wherein determining whether to update the predictive model based on the comparison comprises:
determining a difference between the updated attention score and the predicted attention score; and
comparing the determined difference to a threshold value.

7. The method of claim 2, wherein determining an updated attention score for the target user comprises:
receiving a listening pattern of the target user;
evaluating the join timestamp and the request time point received in the request based on the listening pattern; and
adjusting the updated attention score based on the evaluation.

8. The method of claim 1, wherein the predictive model describes an exponential decay relationship between user attention score and a user join duration.

9. The method of claim 1 further comprising:
subsequent to receiving the request, identifying a characteristic of the target user; and
retrieving a predictive model generated for a target audience with the identified characteristic of the target user.

10. The method of claim 1, wherein the predictive model is generated by:
receiving a plurality of experimental training examples, each training example comprising a join duration representing a duration of time between when a user joined a prior live stream and a break in the prior live stream;
generating, for each experimental training example, an experimental attention score for the user, the experimental attention score associated with the join duration; and
generating the predictive model based on a plurality of the generated experimental attention scores.

11. The method of claim 10, wherein each training example further comprises one or more user actions performed by the user on a content item presented on a client device to the user during the break in the prior live stream.

12. The method of claim 11, wherein generating the experimental attention score for the user comprises:
for each of the one or more user actions in the training example:
assigning a weight to the user action; and
adjusting the experimental attention score based on the weight assigned to the user action.

13. The method of claim 10, wherein generating the predictive model comprises fitting an exponentially decaying curve describing a relationship between the plurality of experimental attention scores and the join duration associated with a training example that each experimental attention score was calculated from.

14. A non-transitory computer-readable medium comprising computer code that, when executed by a processor, causes the processor to:
receive a request comprising a join timestamp representing when a target user joined a live stream and a request time point representing a break in the live stream;
apply a predictive model to a join duration that represents a difference between the join timestamp and the request time point to generate a predicted attention score for the target user, the predicted attention score representing a perspicaciousness of a predicted user at the request time point;
determine whether the predicted attention score is greater than a threshold score; and
responsive to the determination that the predicted attention score is greater than the threshold score, retrieve a content item from a first content category of a plurality of content categories; and
provide the retrieved content item to the target user during the break in the live stream.

15. The non-transitory computer-readable medium of claim 14 further comprising computer code that, when executed by the processor, causes the processor to:
determine an updated attention score for the target user corresponding to the request time point;
compare the updated attention score to the predicted attention score; and
determine whether to update the predictive model based on the comparison.

16. The non-transitory computer-readable medium of claim 15, wherein the computer code that causes the processor to determine the updated attention score further comprises computer code that, when executed by the processor, causes the processor to:
receive one or more user actions performed by a user on a content item presented on a client device to the user during the break in the live stream; and
generate the updated attention score based on the one or more user actions.

17. The non-transitory computer-readable medium of claim 16, wherein each of the one or more user actions is one of a click on the content item, a conversion, a skip of the content item, a change of volume on the client device, a change in orientation of the client device.

18. The non-transitory computer-readable medium of claim 15, wherein the computer code that causes the processor to determine whether to update the predictive model based on the comparison further comprises computer code that, when executed by the processor, causes the processor to:
determine a difference between the updated attention score and the predicted attention score; and
compare the determined difference to a threshold value.

19. The non-transitory computer-readable medium of claim 14, wherein the predictive model describes an exponential decay relationship between user attention score and a user join duration.

20. The non-transitory computer-readable medium of claim 14, further comprising computer code that, when executed by the processor, causes the processor to generate the predictive model, wherein the computer code that causes the processor to generate the predictive model further comprises computer code that, when executed by the processor, causes the processor to:
receive a plurality of experimental training examples, each training example comprising a join duration representing a duration of time between when a user joined a prior live stream and a break in the prior live stream;
generate, for each experimental training example, an experimental attention score for the user, the experimental attention score associated with the join duration; and
generate the predictive model based on a plurality of the generated experimental attention scores.

* * * * *

UNITED STATES PATENT AND TRADEMARK OFFICE
CERTIFICATE OF CORRECTION

PATENT NO. : 10,051,327 B1
APPLICATION NO. : 15/652221
DATED : August 14, 2018
INVENTOR(S) : Bruno Nieuwenhuys et al.

Page 1 of 1

It is certified that error appears in the above-identified patent and that said Letters Patent is hereby corrected as shown below:

In the Claims

Column no: 18, Line(s): 39, Claim 1: "a predicted user" to read as – the target user –

Column no: 18, Line(s): 58, Claim 3: "by a user" to read as – by the user –

Column no: 19, Line(s): 23 & 24, Claim 8: "between user attention score" to read as – between a user attention score –

Column no: 19, Line(s): 28, Claim 9: "retrieving a predictive model" to read as – retrieving the predictive model –

Column no: 19, Line(s): 34, Claim 10: "when a user" to read as – when the user –

Column no: 20, Line(s): 2, Claim 14: "a predicted user" to read as – the target user –

Column no: 20, Line(s): 26, Claim 16: "by a user" to read as – by the user –

Column no: 20, Line(s): 47, Claim 19: "between user attention score" to read as – between a user attention score –

Signed and Sealed this
Ninth Day of July, 2019

Andrei Iancu
*Director of the United States Patent and Trademark Office*